United States Patent
Salyer

(10) Patent No.: US 11,001,398 B1
(45) Date of Patent: May 11, 2021

(54) WIRELESS REMOTE CONTROLLED ROTORCRAFT TUG ASSEMBLY AND METHOD OF MANEUVERING A ROTORCRAFT

(71) Applicant: Jim D. Salyer, Central Point, OR (US)

(72) Inventor: Jim D. Salyer, Central Point, OR (US)

(*) Notice: Subject to any disclaimer, the term of this patent is extended or adjusted under 35 U.S.C. 154(b) by 181 days.

(21) Appl. No.: 16/261,835

(22) Filed: Jan. 30, 2019

Related U.S. Application Data

(60) Provisional application No. 62/649,833, filed on Mar. 29, 2018.

(51) Int. Cl.
*B62D 1/24* (2006.01)
*B64F 1/22* (2006.01)
*B60P 7/08* (2006.01)
*B60P 3/11* (2006.01)

(52) U.S. Cl.
CPC ............. *B64F 1/228* (2013.01); *B60P 3/11* (2013.01); *B60P 7/0823* (2013.01)

(58) Field of Classification Search
CPC .. B64F 1/228; B64F 1/22; B64F 1/224; B64F 1/007; B64F 1/227; B64F 1/225; B64F 1/00; B64F 1/002; B66F 7/065; B66F 7/08; B66F 7/0625; B66F 7/00; B66F 7/06; B66F 5/00; B66F 5/02; B60P 3/00; B60P 3/06; B60P 3/11; B60P 7/0823; B60P 7/06; B60P 7/08
See application file for complete search history.

(56) References Cited

U.S. PATENT DOCUMENTS

| | | | |
|---|---|---|---|
| 2,712,430 A * | 7/1955 | Stuebing, Jr. | B62B 3/0612 254/2 B |
| 3,009,711 A * | 11/1961 | White | B64F 1/22 280/43.23 |
| 3,761,040 A | 9/1973 | Cummins | |
| 3,937,290 A | 2/1976 | Benning | |
| 3,946,886 A * | 3/1976 | Robinson | B60P 3/11 414/430 |
| 4,033,422 A | 7/1977 | Benning | |
| 4,223,856 A | 9/1980 | DiVincenzo | |
| 4,488,612 A | 12/1984 | Patterson | |
| 4,576,245 A * | 3/1986 | Oldani | B62D 51/005 180/14.1 |
| 4,580,764 A | 4/1986 | Oldani | |

(Continued)

*Primary Examiner* — James M Dolak
(74) *Attorney, Agent, or Firm* — Jerry Haynes Law

(57) ABSTRACT

A wireless remote controlled rotorcraft tug assembly and method of maneuvering a rotorcraft positions a rotorcraft, of the type having skids, through use of a remote controlled low-profile tug vehicle that maneuvers in a tight 360° motion to maneuver the rotorcraft to a desired location, and operates multiple arms to raise, lower, and support the rotorcraft. A forward support arm and at least one lever arm are selectively movable through hydraulic or electrical means to engage the undercarriage of the fuselage for raising, lowering, and supporting the rotorcraft. A lateral arm connects to the skids from free ends to raise and lower the rotorcraft by the skids. A motor advances the tug vehicle by powering a drive wheel. A guide wheel attaches to a steering mechanism and enables 360° turns and precise maneuverability. A radio receiver and transmitter work to remotely control the motor and the arm control subassembly.

19 Claims, 7 Drawing Sheets

(56) References Cited

U.S. PATENT DOCUMENTS

| | | | |
|---|---|---|---|
| 5,056,981 A | | 10/1991 | Knowles |
| 5,135,346 A | | 8/1992 | Roach |
| 5,248,115 A | * | 9/1993 | Aurelio .................. B64F 1/125 |
| | | | 114/261 |
| 5,701,966 A | | 12/1997 | Amico |
| 6,325,403 B1 | * | 12/2001 | Brutger .................... B60P 3/11 |
| | | | 280/444 |
| 7,040,425 B2 | * | 5/2006 | Hammonds .............. B60D 1/36 |
| | | | 180/6.48 |
| 7,275,713 B2 | * | 10/2007 | Hillsamer ............... B66F 3/245 |
| | | | 244/50 |
| 7,607,608 B2 | * | 10/2009 | Morris ...................... B62B 3/00 |
| | | | 182/69.6 |
| 8,573,916 B2 | * | 11/2013 | Hwu ........................ B64F 1/22 |
| | | | 414/482 |
| 8,607,905 B2 | | 12/2013 | Johnson |
| 9,056,686 B2 | | 6/2015 | Chan et al. |
| 9,227,737 B2 | | 1/2016 | Chan et al. |
| 10,179,660 B2 | * | 1/2019 | St. Louis ................ B64C 27/04 |
| 10,569,903 B2 | * | 2/2020 | Coccaro ................ B62B 5/0086 |
| 2012/0255802 A1 | * | 10/2012 | Hancock .................. B64F 1/22 |
| | | | 180/169 |

\* cited by examiner

WIRELESS REMOTE CONTROLLED ROTORCRAFT TUG ASSEMBLY AND METHOD OF MANEUVERING A ROTORCRAFT

CROSS-REFERENCE TO RELATED APPLICATIONS

This application claims the benefit of U.S. provisional application No. 62/649,833, filed Mar. 29, 2018 and entitled WIRELESS REMOTE CONTROLLED ROTORCRAFT TUG SYSTEM AND METHOD OF MANEUVERING A ROTORCRAFT, which provisional application is incorporated by reference herein in its entirety.

FIELD OF THE INVENTION

The present invention relates generally to a wireless remote controlled rotorcraft tug assembly and method of maneuvering a rotorcraft. More so, the present invention relates to a tug assembly configured to raise, lower, and maneuver a rotorcraft of the type having skids through use of a remote controlled low-profile tug vehicle that advances below the fuselage of the rotorcraft and operates multiple arms to raise, lower, and support the rotorcraft, while also maneuvering up to 360° for positioning the rotorcraft to a desired position.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Typically, a rotorcraft includes landing gear, such as an undercarriage or skids by which the rotorcraft is supported on a ground surface. For example, the landing gear may be provided as a pair of skids, wheels, or three or four wheeled undercarriages constituting a support polygon for the aircraft on the ground. Rotorcraft engine power is almost exclusively used to taxi the rotorcraft, typically to or from a runway. Operation of the rotary blades and engines in a ground environment may be relatively loud and, when used to provide aircraft ground movement, create heavy air turbulence and burn relatively large quantities of fuel.

Generally, a tug is used to advance rotorcraft across the taxi area. The tug is a small manned vehicle which couples to the aircraft nose gear such that the vehicle may push or tow the rotorcraft. The tug commonly utilizes a separate tow bar system for attachment to the rotorcraft nose gear. Those skilled in the art will recognize that the typical means of maneuvering a rotorcraft, such as a helicopter with skid-type landing gear, is either to attach its factory-supplied ground handling wheels and utilize two or more personnel to balance, maneuver, and push the aircraft; or to utilize a hydraulic lifting and towing device. These positioning techniques require multiple operators, which require manpower and is dangerous around the rotating rotors. Also, the attachment to the helicopter skids is not always efficient.

Other proposals have involved apparatuses and methods for maneuvering rotorcraft, such as helicopters. The problem with these apparatuses is that they do not grip the undercarriage, such as skids efficiently. Also, the tug is not very maneuverable below the fuselage of the rotorcraft. Even though the above cited apparatuses and methods for maneuvering rotorcraft meets some of the needs of the market, a wireless remote controlled rotorcraft tug assembly and method of maneuvering a rotorcraft that raises, lowers, and maneuvers a rotorcraft of the type having skids through use of a remote controlled low-profile tug vehicle that advances below the fuselage of the rotorcraft and operates multiple arms to raise, lower, and support the rotorcraft, while also maneuvering up to 360° for positioning the rotorcraft to a desired position, is still desired.

SUMMARY

Illustrative embodiments of the disclosure are generally directed to a wireless remote controlled rotorcraft tug assembly and method of maneuvering a rotorcraft. The rotorcraft tug assembly serves to raise, lower, and maneuver a rotorcraft, of the type having skids, through use of a remote controlled low-profile tug vehicle that advances below the fuselage of the rotorcraft and operates multiple arms to raise, lower, and support the rotorcraft, while also maneuvering up to 360° for positioning the rotorcraft to a desired position A wireless remote controlled rotorcraft tug assembly. The rotorcraft tug assembly comprises a tug vehicle comprising a frame and an elongated chassis. The frame is defined by a forward end, a rearward end, and sidewalls. A fulcrum joins with the frame. In some embodiments, a forward support arm extends from the forward end of the tug vehicle. The forward support arm is operable to raise to a sloped position, and also operable to lower to a parallel position.

In some embodiments, the rotorcraft tug assembly further comprises a lateral arm that extends from the sidewalls of the tug vehicle. The lateral arm is defined by a middle section and a pair of free ends that slidably extend and retract from the middle section. The rotorcraft tug assembly further comprises at least one lever arm that is defined by a fulcrum end and a distal end. The fulcrum end is pivotable about the fulcrum, and the distal end is joined with the lateral arm. In this manner, the lever arm pivots upwardly to a raised position for raising the lateral arm. Also, the lever arm pivots downwardly to a lowered position for lowering the lateral arm.

In some embodiments, the rotorcraft tug assembly further comprises an arm control subassembly for controlling the forward support arm and the lateral arms. In other embodiments, at least one drive wheel is joined to the frame to enable advancement of the tug vehicle. A motor drives the drive wheel. A power supply works to power the motor. In yet other embodiments, a steering mechanism is operationally attached to the terminus of the chassis to guide the direction of the drive wheel. At least one guide wheel is operatively connected to the steering mechanism. The guide wheel is rotatable up to 360°. In this manner, the tug vehicle is maneuverable in a forward direction, a rearward direction, and a 360° radius.

In another aspect, the tug vehicle is defined by a low profile enabling maneuverability beneath a fuselage of a rotorcraft. And further, the fuselage comprises a nose at a forward fuselage section and an undercarriage beneath the fuselage.

In another aspect, the forward support arm terminates at a support bracket that aligns with the nose of the fuselage, such that the forward support arm helps support the rotorcraft.

In another aspect, the free ends of the lateral arm comprise a fastening mechanism that detachably fastens to the undercarriage of the fuselage.

In another aspect, the lever arm pivots upwardly to a raised position for raising the lateral arm, such that the skids raise above the ground.

In another aspect, the lever arm pivots downwardly to a lowered position for lowering the lateral arm, whereby the skids lower to the ground.

In another aspect, the tug assembly further comprises a radio transmitter that is operational to transmit a control signal towards the tug vehicle. The control signal comprises data for controlling the motor, the arm control subassembly, and the steering mechanism.

In another aspect, the tug assembly further comprises an antenna joined to the frame for receiving the control signal from the radio transmitter.

In another aspect, the tug assembly further comprises a radio receiver being operable in the frame, the radio receiver receiving the control signal from the antenna in the form of an electrical signal, whereby the motor, the control assembly, the position of the arms, the steering mechanism, and the direction of the drive wheel are remotely controlled.

In another aspect, the tug vehicle has a rectangular shape.

In another aspect, the at least one lever arm comprises three hook-shaped lever arms.

In another aspect, the fastening mechanism at the free ends of the lateral arm comprises a hook, or a latch, or a carabiner.

In another aspect, the at least one guide wheel is disposed at the forward end of the frame.

In another aspect, the support bracket comprises a platform and a pair of legs.

In another aspect, the rotorcraft includes at least one of the following: a helicopter, a tilt rotorcraft, a quadcopter, a fixed wing aircraft, and a VTOL aircraft.

In another aspect, the arm control subassembly is hydraulically powered or electrically powered.

One objective of the present invention is to remotely maneuver a wide variety of rotorcrafts without the use of adapters.

Another objective is to provide a pivotable forward support arm that is controllable to support the nose of the rotorcraft fuselage at a desired angle.

Another objective is to provide a lateral arm that has variable distance between the lifting fastening mechanisms, so as to lift variously sized rotorcrafts and variously spaced-apart skids on the rotorcrafts to and from the ground.

Yet another objective is to maneuver the tug vehicle in a 360° motion to maneuver the rotorcraft to a desired position.

Yet another objective is to provide a remote control transmitter and receiver to remotely control the motor, the control assembly, and the steering mechanism of the tug vehicle.

Yet another objective is to provide a rotorcraft tug which is simple to operate for lifting, lowering, and maneuvering a rotorcraft.

Other systems, devices, methods, features, and advantages will be or become apparent to one with skill in the art upon examination of the following drawings and detailed description. It is intended that all such additional systems, methods, features, and advantages be included within this description, be within the scope of the present disclosure, and be protected by the accompanying claims and drawings.

BRIEF DESCRIPTION OF THE DRAWINGS

The invention will now be described, by way of example, with reference to the accompanying drawings, in which.

Like reference numerals refer to like parts throughout the various views of the drawings.

DETAILED DESCRIPTION OF THE INVENTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Specific dimensions and other physical characteristics relating to the embodiments disclosed herein are therefore not to be considered as limiting, unless the claims expressly state otherwise.

Figure 1:
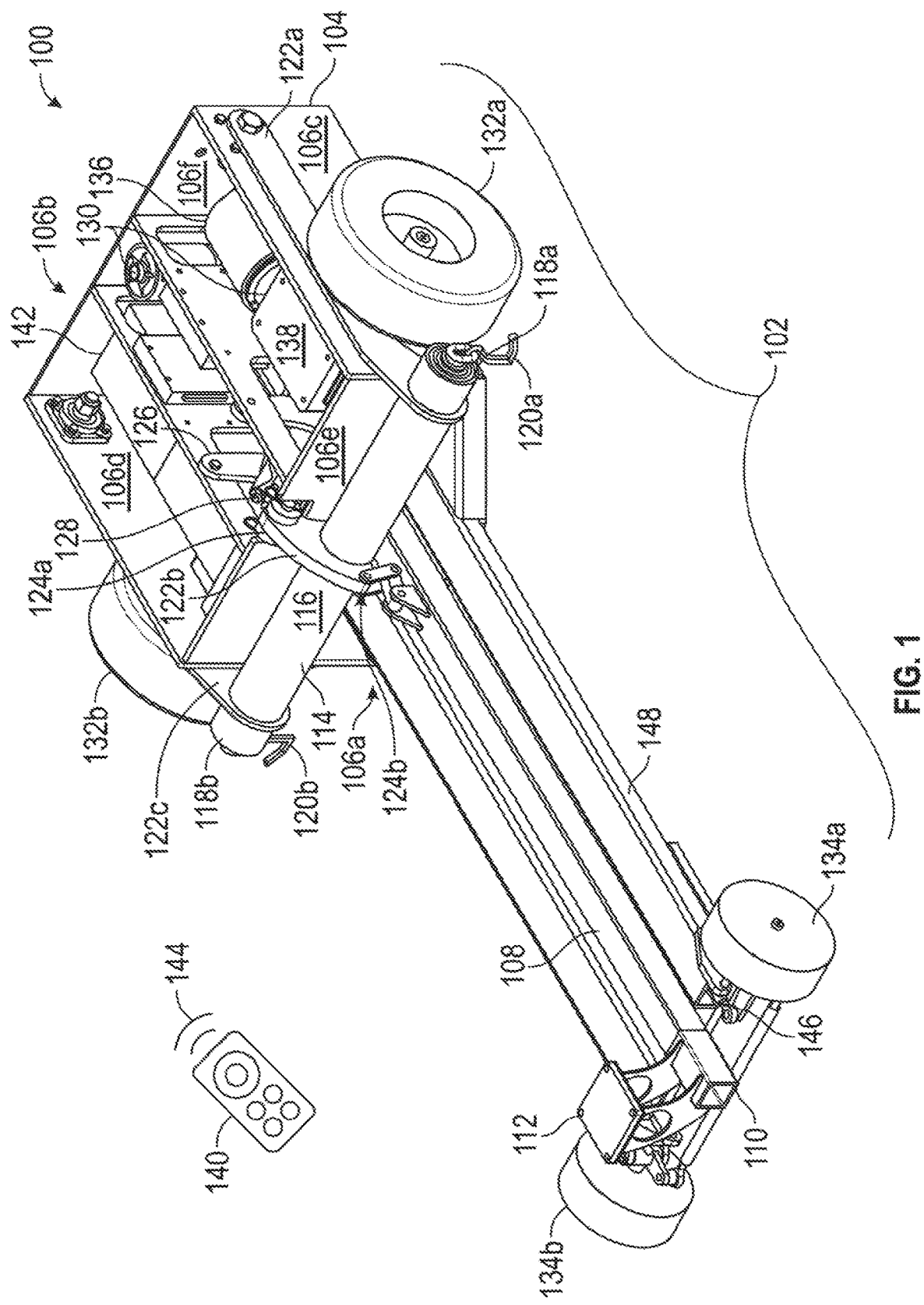
FIG. 1 illustrates an open body perspective view of a wireless remote controlled rotorcraft tug assembly being controlled by a radio transmitter, in accordance with an embodiment of the present invention.

A wireless remote controlled rotorcraft tug assembly 100 and method 1000 of maneuvering a rotorcraft is referenced in FIGS. 1-10. As illustrated in FIG. 1, the present invention provides a wireless remote controlled rotorcraft tug assembly 100 and method 1000 of maneuvering a rotorcraft. The wireless remote controlled rotorcraft tug assembly 100, hereafter "tug assembly 100" is operable to raise, lower, and maneuver a rotorcraft 200—of the type having an undercarriage 206a, 206b, i.e., skids 13 under the fuselage 202. In some embodiments, the rotorcraft 200 may include, without limitation, a helicopter, a tilt rotorcraft, a quadcopter, a fixed wing aircraft, and a VTOL aircraft. Though in other embodiments, rotorcraft 200 that do not have an undercarriage may be supported and maneuvered through reconfiguration of forward and lateral support arms 108, 114, as discussed below.

Figure 2:
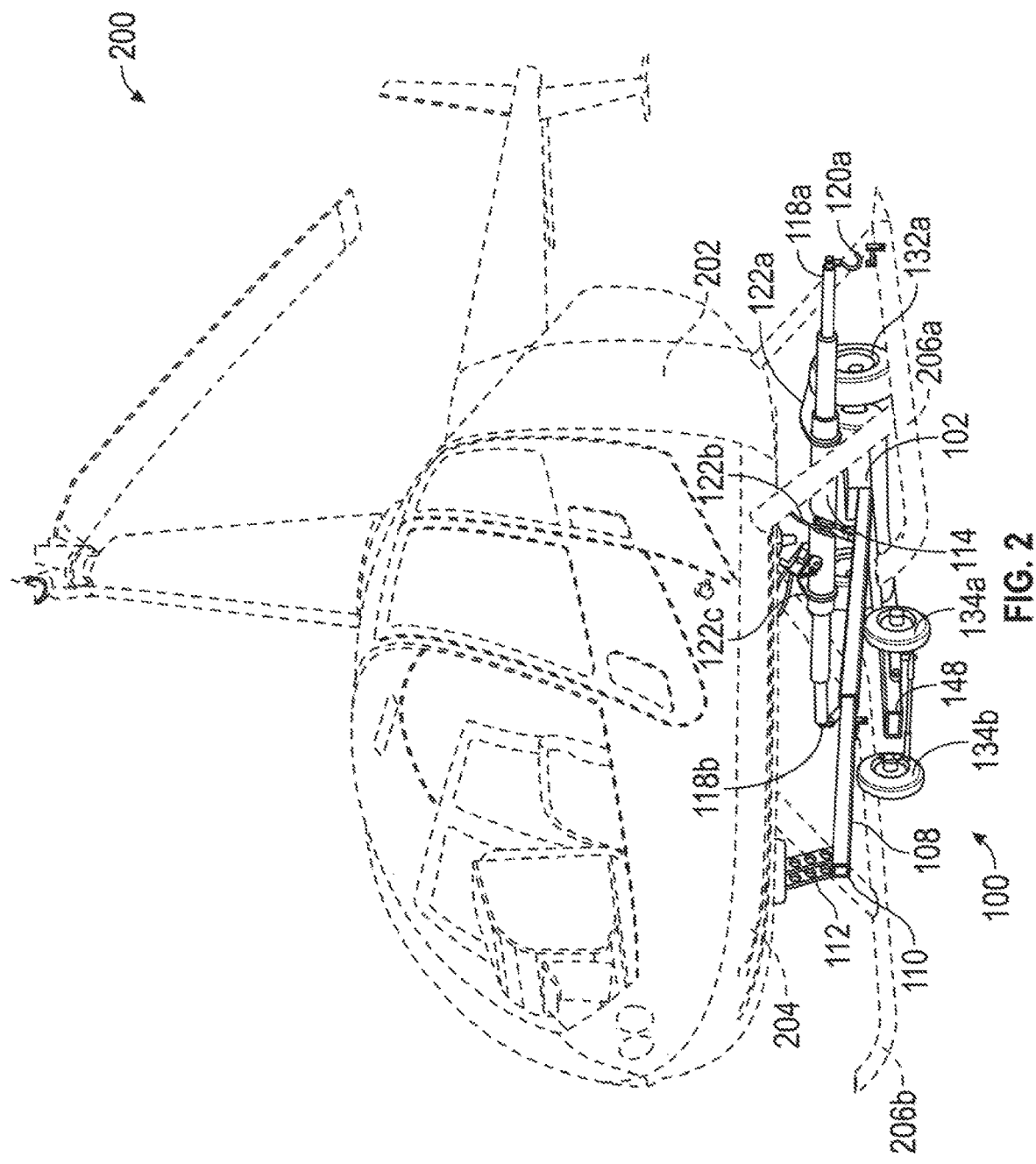
FIG. 2 illustrates a front perspective view of an exemplary wireless remote controlled rotorcraft tug assembly positioned below the fuselage of a rotorcraft for maneuvering the rotorcraft, in accordance with an embodiment of the present invention.

As FIG. 2 shows, the tug assembly 100 utilizes a remote controlled, low-profile tug vehicle 102 that positons and maneuvers beneath the fuselage 202 of the rotorcraft 200. The tug vehicle 102 is configured to control multiple forward and lateral arms 108, 114 that raise, lower, and support the rotorcraft 200 from the nose 204 of the fuselage 202, and also from the stationary skids 206a-b extending beneath the rotorcraft 200. The tug vehicle 102 is also unique in being maneuverable in a tight 360° motion, so as to position the rotorcraft 200 in tight spaces, such as an aircraft hangar. In one exemplary embodiment, the tug assembly 100 is operational to lift and lower the rotorcraft 200 from the skids 206a-b, and maneuver the rotorcraft 200 to a desired position through a remote control mechanism. Further, alternative embodiments of the tug assembly provide a compact tug vehicle 600 that requires less space for operation and stowage.

Figure 3:
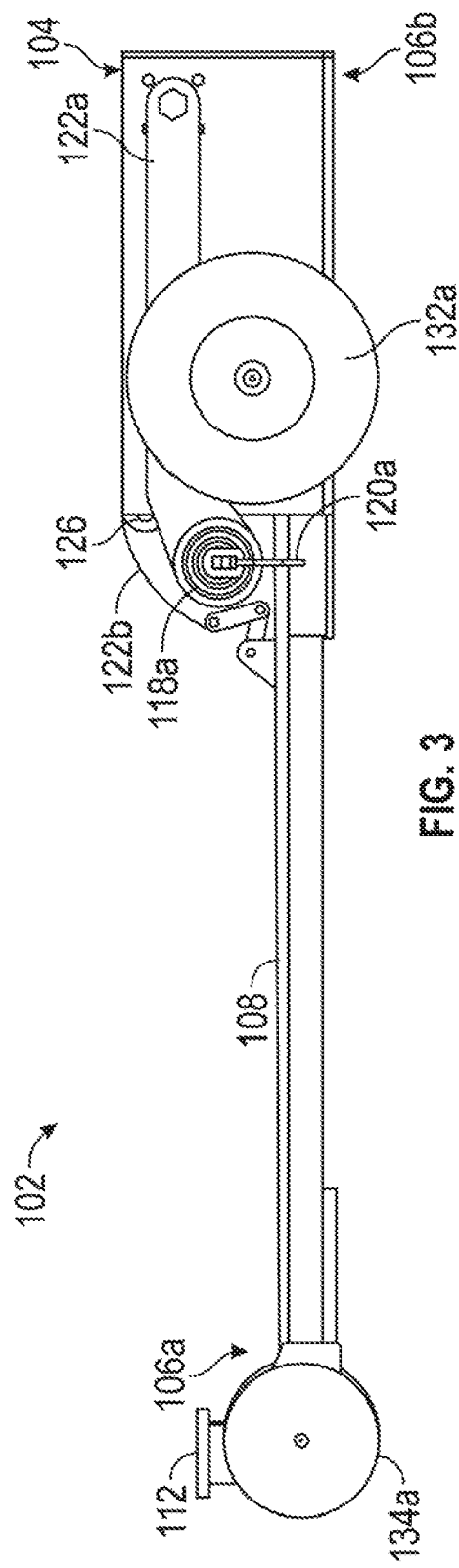
FIG. 3 illustrates an elevated side view of an exemplary tug vehicle, in accordance with an embodiment of the present invention.

Turning now to FIG. 3, the tug assembly 100 comprises a tug vehicle 102. The tug vehicle 102 comprises a frame 104 defined by a forward end 106a, a rearward end 106b, and sidewalls 106c, 106d, 106e, 106f. In one embodiment, the frame 104 has a generally rectangular shape. In another embodiment, the forward end 106a of the frame 104 is the end that is oriented towards the nose 204 of the fuselage 202 while engaged with the rotorcraft 200. The rearward end 106b of the frame 104 is oriented towards a tail on the rotorcraft 200.

As shown in FIG. 2, the tug vehicle 102 is defined by a generally low profile that allows the frame 104 to maneuver beneath the fuselage 202 of the rotorcraft 200. In one non-limiting embodiment, the fuselage is less than 4' high. FIG. 2 illustrates the tug assembly 100 fully engaged beneath the fuselage of the rotorcraft 200. Suitable materials for the tug vehicle 102 may include, without limitation, steel, aluminum, titanium, metal alloys, and a rigid polymer.

In some embodiments, an elongated chassis 148 extends from the forward end of the frame 104. The chassis 148 increases the base width of the tug vehicle 102, so as to enhance stability while supporting and carrying the weight of the rotorcraft 200. In one non-limiting embodiment, the chassis comprises two rigid, metal bars that are welded to the forward end 106a of the frame 104 and terminating at guide wheels 134a-b. A steering mechanism 146 operationally attaches to the terminus of the elongated chassis 148. The steering mechanism 146 may include linkages that operatively connect to at least one guide wheel 134a-b, so as to enable remote directional guiding of the tug vehicle 102.

Turning now to FIG. 3, a forward support arm 108 extends from the forward end 106a of the tug vehicle 102. The forward support arm 108 is configured to pivotally raise and lower between a parallel position and a sloped position relative to the ground. The forward support arm 108 may be anchored at a pivot point inside the frame 104. This allows for incremental pivoted movement by the forward support arm 108.

The parallel position of the forward support arm 108 is used when the tug vehicle 102 is nonoperational. In the sloped position, the forward support arm 108 elevates until the terminus 110 of the forward support arm 108 engages the nose 204 of the fuselage 202. The slope of the forward support arm 108 may be between 15° to 35°, depending on the type of rotorcraft 200 being supported from the nose 204 of the fuselage 202.

Figure 4:
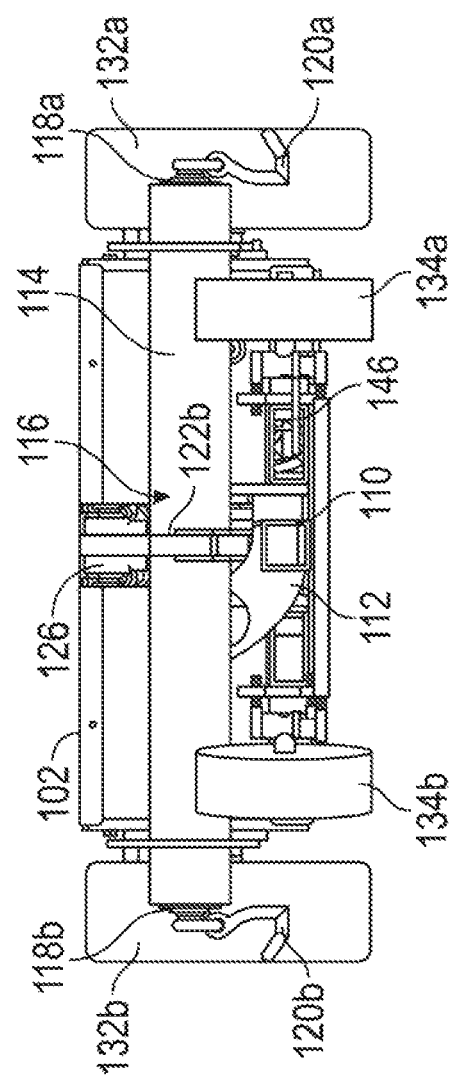
FIG. 4 illustrates a front view of the tug vehicle shown in FIG. 3, in accordance with an embodiment of the present invention.

In one embodiment, the terminus 110 of the forward support arm 108 comprises a support bracket 112 that is configured to align and engage the nose 204 of the fuselage 202. In this manner, the forward support arm 108 helps support the front section fuselage 202 of the rotorcraft 200. In one non-limiting embodiment, the support bracket 112 comprises a platform supported by a pair of legs, as shown in FIG. 4.

Figure 5:
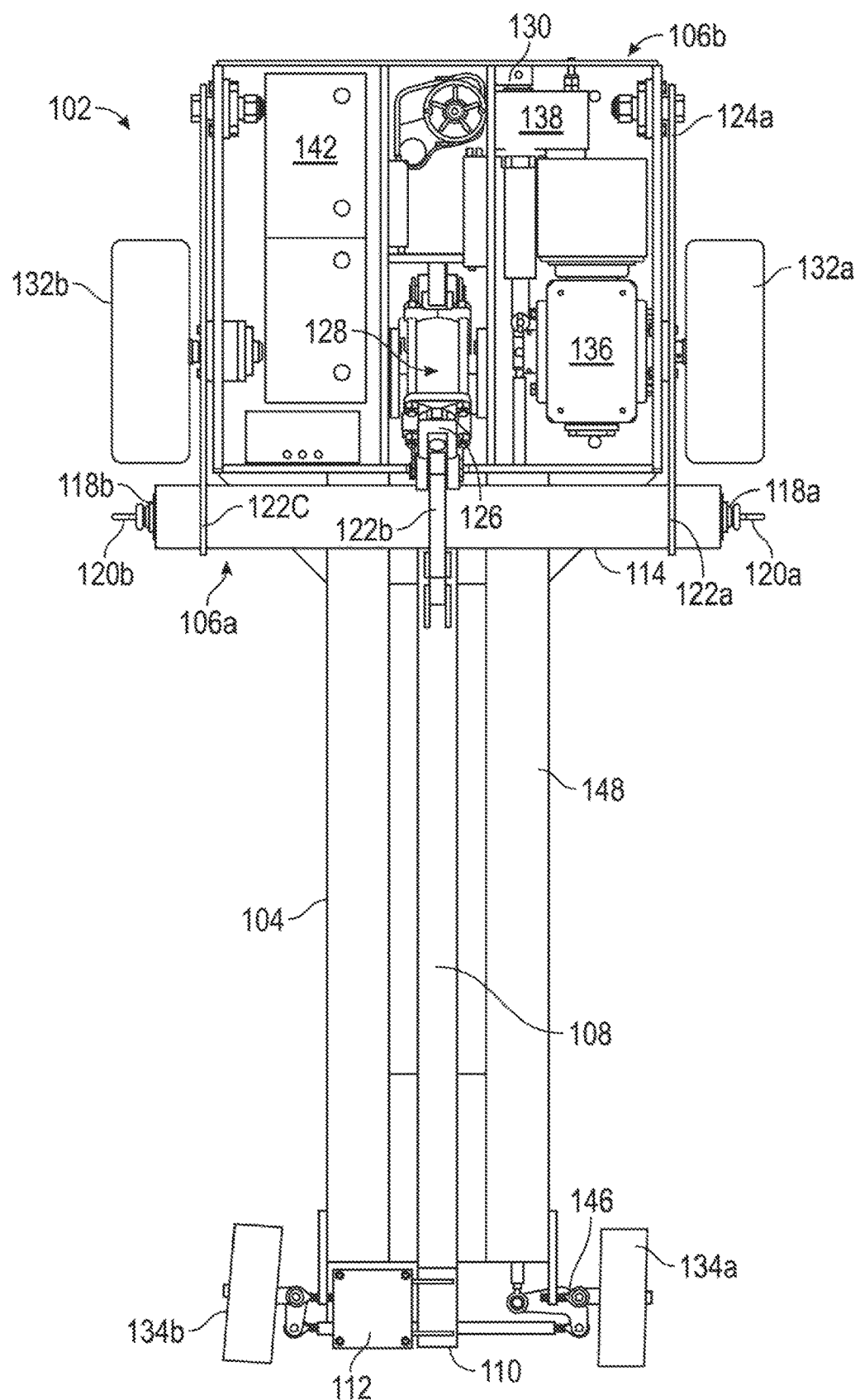
FIG. 5 illustrates a top view of the tug vehicle shown in FIG. 3, in accordance with an embodiment of the present invention.

As FIG. 5 illustrates, the tug assembly 100 may further comprise a lateral arm 114 that extends from the sidewalls 106c, 106d, 106e, 106f of the frame 104. The lateral arm 114 may pass through an opening in the sidewalls 106c-f, pass through a notch at the top edge of the frame sidewalls 106c-f, or lie above the frame 104. In either case, the lateral arm 114 is defined by a middle section 116 and a pair of free ends 118a, 118b. The lateral arm 114 is centrally located on the tug vehicle 102, so as to maintain balance of the rotorcraft 200 relative to the tug vehicle 102. This is especially useful when the tug vehicle 102 positions centrally beneath the fuselage 202.

In some embodiments, the free ends 118a-b may extend and retract either telescopically or slidably from the middle section 116. When the tug vehicle 102 positions centrally beneath the fuselage 202, the free ends 118a-b may extend until approximately above the skids 206a-b. This positions the free ends from the lateral arm 114 to fasten to, and lift the skids 206a-b.

In one non-limiting embodiment, the free ends 118a, 118b comprise a fastening mechanism 120a, 120b that is configured to detachably fasten to the undercarriage 206a-b extending from the fuselage 202. The fastening mechanism 120a, 120b may include a hook that engages a loop or bracket on the skids 206a-b. Though other fastening means known in the art may also be used.

Looking again at FIG. 5, the tug assembly 100 further comprises at least one lever arm 122a-c that is used to raise and lower the lateral arm 114. This is a function for when the free ends 118a-b of the lateral arm 122a-c fasten to the skids 206a, 206b of the rotorcraft 200. The lever arm 122a-c is defined by a fulcrum end 124a 124 and should be positioned at the pivot where 122a is pointing and a distal end 124b. The distal end 124b pivots about a fulcrum 124a in the frame 104 of the tug vehicle 102. The distal end 124b of the lever arm joins with the middle section 116 of the lateral arm 114. In one non-limiting embodiment, the at least one lever arm 122a-c comprises three hook-shaped lever arms 120a, 120b, 122b disposed in a spaced-apart relationship across the length of the lateral arm 122a-c. Though in other embodiments, more or less than three lever arms may also be used.

In one embodiment, the distal end 124b of the lever arm 122a-c has a hook-shape that grips the middle section 116 of the lateral arm 114 to provide secure connections while lifting and lowering the skids 206a-b. Thus, the lever arm 122a-c pivots upwardly to a raised position for raising the lateral arm 114. In the raised position, the lateral arm 114 lifts the rotorcraft 200 by the skids 206a-b. In this manner, the friction of the rotorcraft's skids 206a-b bearing against the ground do not inhibit movement by the rotorcraft 200. While the rotorcraft 200 is raised in such a manner, the tug vehicle 102 maneuvers the rotorcraft 200 to a desired position. After moving the rotorcraft 200 to a desired position. In the lowered position, the lever arm 122a-c pivots downwardly to lower the lateral arm 114, and thereby return the skids 206a-b to the ground.

As shown back in FIG. 1, the tug assembly 100 further includes an arm control subassembly 128, which may be, but not limited to, hydraulic or electrical, for controlling the forward, lateral, and lever arms 108, 114, 122a-c. The arm control subassembly 128 may include a quasi-hydrostatic drive or transmission mechanism that uses pressurized hydraulic fluid to power the forward support arm 108, the lateral arm 114, and the at least one lever arm 122a-c.

In one non-limiting embodiment, the hydraulic configuration of the arm control subassembly 128 comprises three parts: a generator (e.g. a hydraulic pump), driven by an electric motor; valves, filters, piping etc. (to guide and control the arm control subassembly); and an actuator (e.g. a hydraulic motor or hydraulic cylinder) to drive the machinery for raising and lowering the arms 108, 114, 122a-c. The electrical configuration of the arm control subassembly 128 may include a network of electrical components deployed to supply, transfer, store, and use electric power to the arms 108, 114, 122a-c and motor 136 through the tug vehicle 102.

Looking again at FIG. 4, the tug assembly 100 further includes at least one drive wheel 132a, 132b that enables advancement of the tug vehicle 102 in a forward and rearward direction. The drive wheel 132a-b may include a rigid rubber, or air-filled tube that rolls along the ground. The drive wheel 132a-b may have an axle, bearings, linkages, and other components that enable rotation and possible steering capacity. In one non-limiting embodiment, two spaced-apart drive wheels 132a, 132b operably position on opposite sides of the frame 104.

In some embodiments, a motor 136 powers, or drives, the drive wheel 132a-b, so as to enable forward and rearward advancement of the tug vehicle 102. The motor 136 may include, without limitation, a combustion motor, an electrical motor with an independent power source, or an electrical motor powered by the electrical assembly 130 discussed above. In some embodiments, a power supply 142, such as a rechargeable battery, or D/C battery, may power the motor 136.

As discussed above, the tug vehicle 102 maneuvers easily beneath the fuselage 202 of the rotorcraft 200 through use of a steering mechanism is operationally attached to the terminus of the chassis to guide the direction of the drive wheel. At least one guide wheel is operatively connected to the steering mechanism. The guide wheel is rotatable up to 90°. In this manner, the tug vehicle is maneuverable in a forward direction, a rearward direction, and a 360° radius. In an alternative embodiment, the guide wheel is a freely rotatable swivel wheel.

As FIG. 4 shows, at least one guide wheel 134a-b is operational at the forward end 106a of the frame 104. Though in other embodiments, the guide wheel is operational at the rearward end 106b, or the sidewalls 106c-f of the frame 104. The guide wheel 134a-b enables the tug vehicle to maneuver 360° and around tight corners. This helps in positioning the rotorcraft 200 in a desirable position. The guide wheel may include a rigid, rubber, or air-inflated tire that has an axle, bearings, and other components that enable free rolling and rotation.

Figure 6:
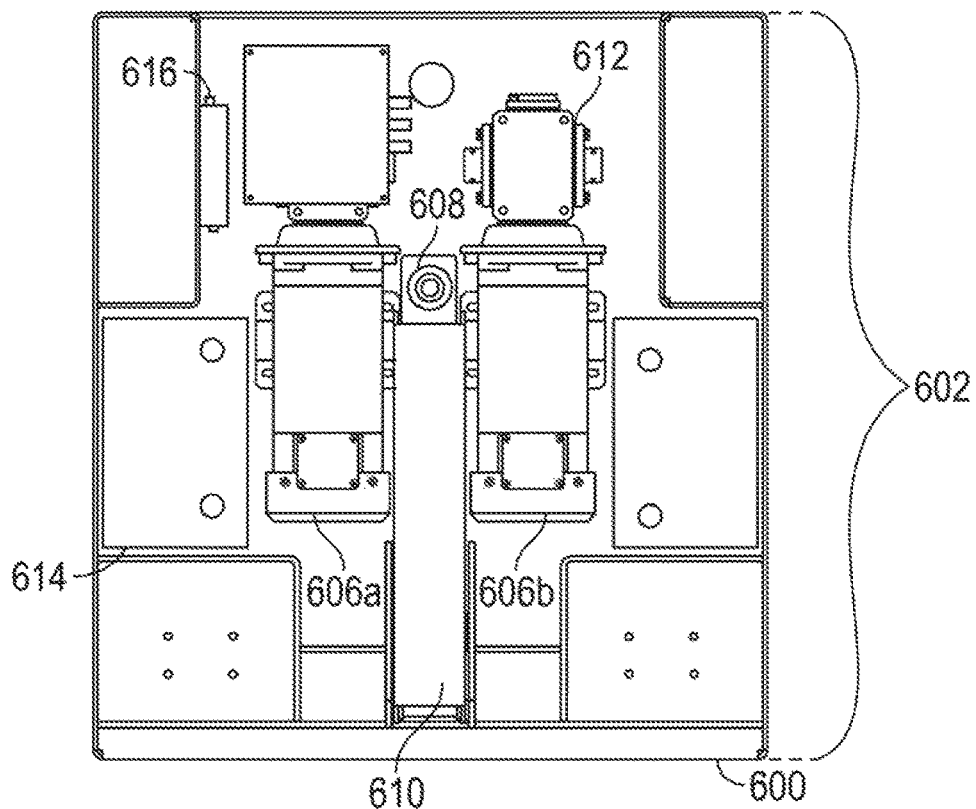
FIG. 6 illustrates a top view of an alternative compact embodiment of the tug vehicle, in accordance with an embodiment of the present invention.

In some embodiments, multiple guide wheels 134a-b may be positioned at any position along the frame of the tug vehicle (FIG. 6). The steering mechanism 146, discussed above, operationally attaches to the terminus of the elongated chassis 148 and the guide wheel 134a-b. However in other embodiments, the steering mechanism and the guide wheel are operationally attached to the rear or lateral sidewalls 106f, 106c, 106d.

As discussed above, the tug vehicle 102 is operational through remote control means. This remote operation includes movement of the arms 108, 114, 122a-c, advancement of the tug vehicle 102, and steering of the guide wheels 134a-b. For this purpose, the tug assembly 100 provides a radio receiver 138 and a radio transmitter 140 (FIG. 1).

The radio receiver 138 is operable in the tug vehicle 102 for controlling the motor 136, and for controlling the arm control subassembly 130 that carries the arms 108, 114, 122a-c to their respective positions. The radio transmitter 140 is operational to transmit a control signal 144 to the radio receiver 138. This may include radio, UV, or other signals known in the art. In this manner the motor 136, arms 108, 114, 122a-c, and arm control subassembly 130 are remotely controlled by a user at a distance from the rotorcraft 200 (FIG. 1). This remote controlling means helps enhance safety, so as to avoid contact with the rotors of the rotorcraft 200 after landing.

FIGS. 6-9 illustrate an alternative compact tug vehicle 600 that is shorter, primarily through use of a cube-shaped frame 602 and an absence of an elongated chassis, as described above. As shown in FIG. 6, the steering capacity is reduced from the prior embodiment. Here, two swivel wheels 604a, 604b as well as differentially driven wheels 618a, 618b are utilized—rather than the guide wheels discussed above. These wheels 604a-b, 618a-b allow for tighter steering and 360° maneuverability of the tug vehicle 600. This shorter, compact configuration of the tug vehicle 602 requires less space for operation and stowage.

Figure 7:
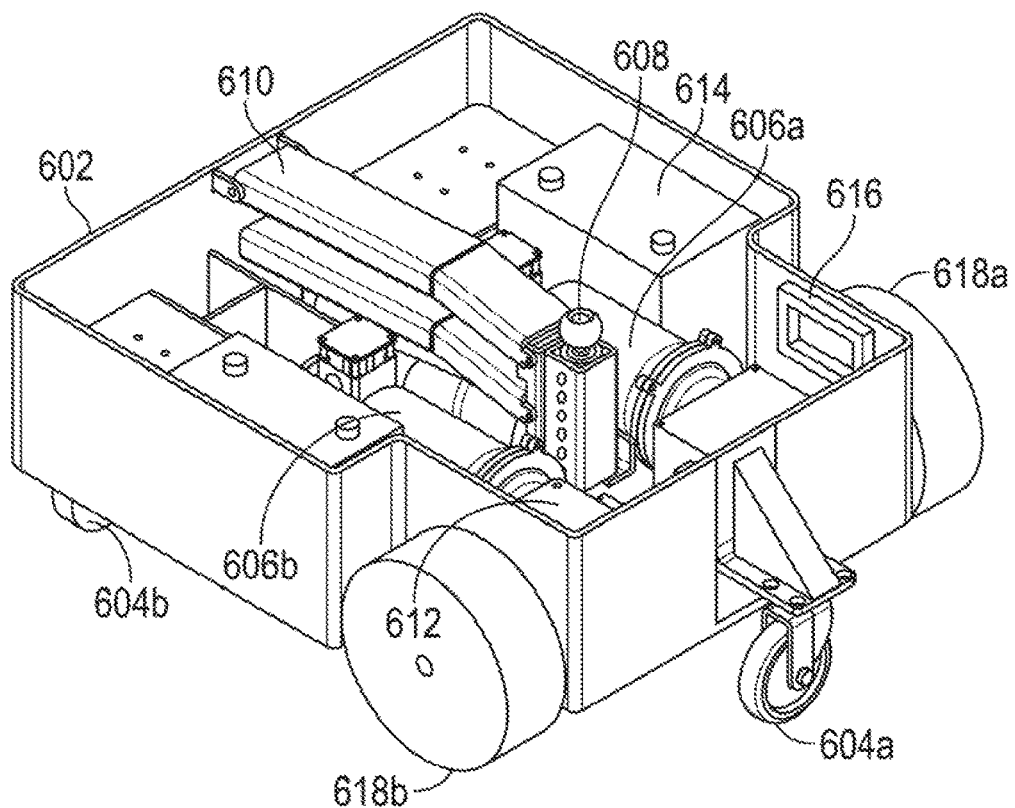
FIG. 7 illustrates a perspective view of the compact tug vehicle shown in FIG. 6, in accordance with an embodiment of the present invention.

FIG. 7 illustrates an open top perspective view of the tug vehicle 600, showing the components contained therein. As in the standard tug vehicle 102, the compact version comprises a motors 606a, 606b, and a forward support arm 610. Though it is significant to note that the lateral arm is not used here. A power source 614 and a radio receiver 616 may also be used for powering the motors 606a, 606b, and remotely controlling the motors, respectively. Differential gears 612 may couple to the motors 606a-b.

Figure 8:
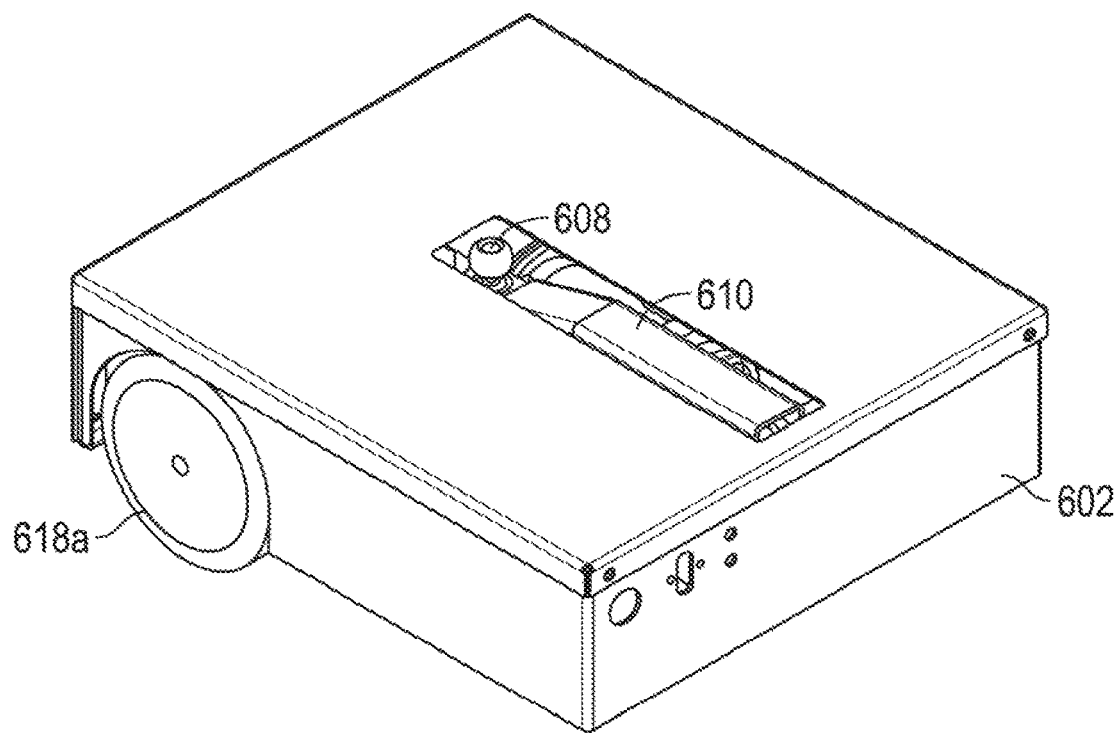
FIG. 8 illustrates a side elevated view of the compact tug vehicle shown in FIG. 6, in accordance with an embodiment of the present invention.
Figure 9:
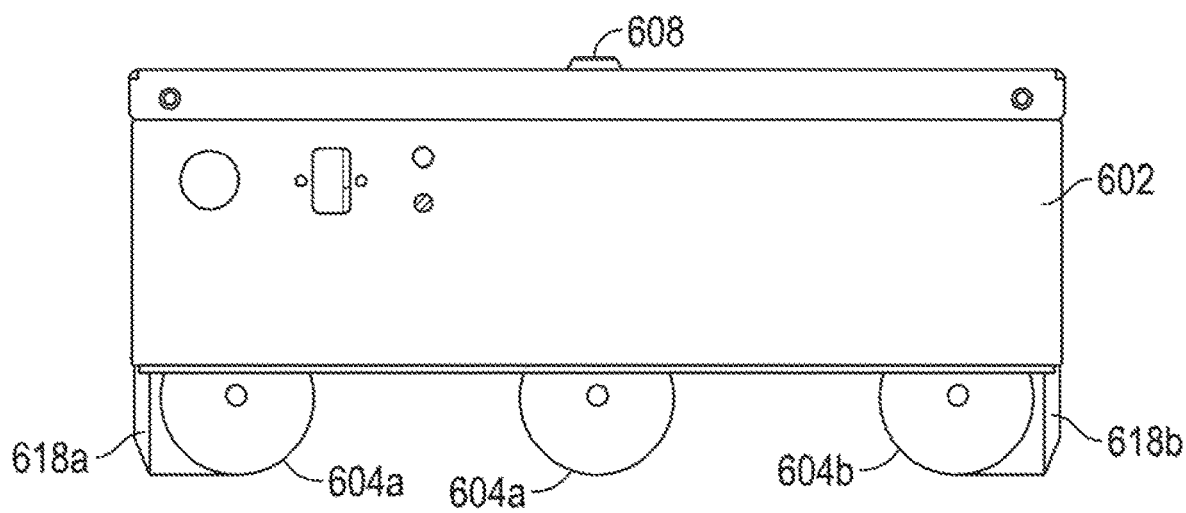
FIG. 9 illustrates a frontal view of the compact tug vehicle shown in FIG. 6, in accordance with an embodiment of the present invention.

FIG. 8 illustrates yet another view, showing a side elevated view of the compact of the tug vehicle 600. As shown, a pair of drive wheels 618a, 618b, which are powered by the motors 606a, 606b, advance the tug vehicle 600 in a forward, rearward, or rotational direction under the rotorcraft fuselage 202. Also shown is a trailer hitch 608 with integrated rotorcraft receiver, by hitch the rotorcraft can be hitched for an additional tethering point. And FIG. 9 illustrates a frontal view of the compact tug vehicle 600, showing the swivel wheels 604a-b and drive wheels 618a-b in operation.

Figure 10:
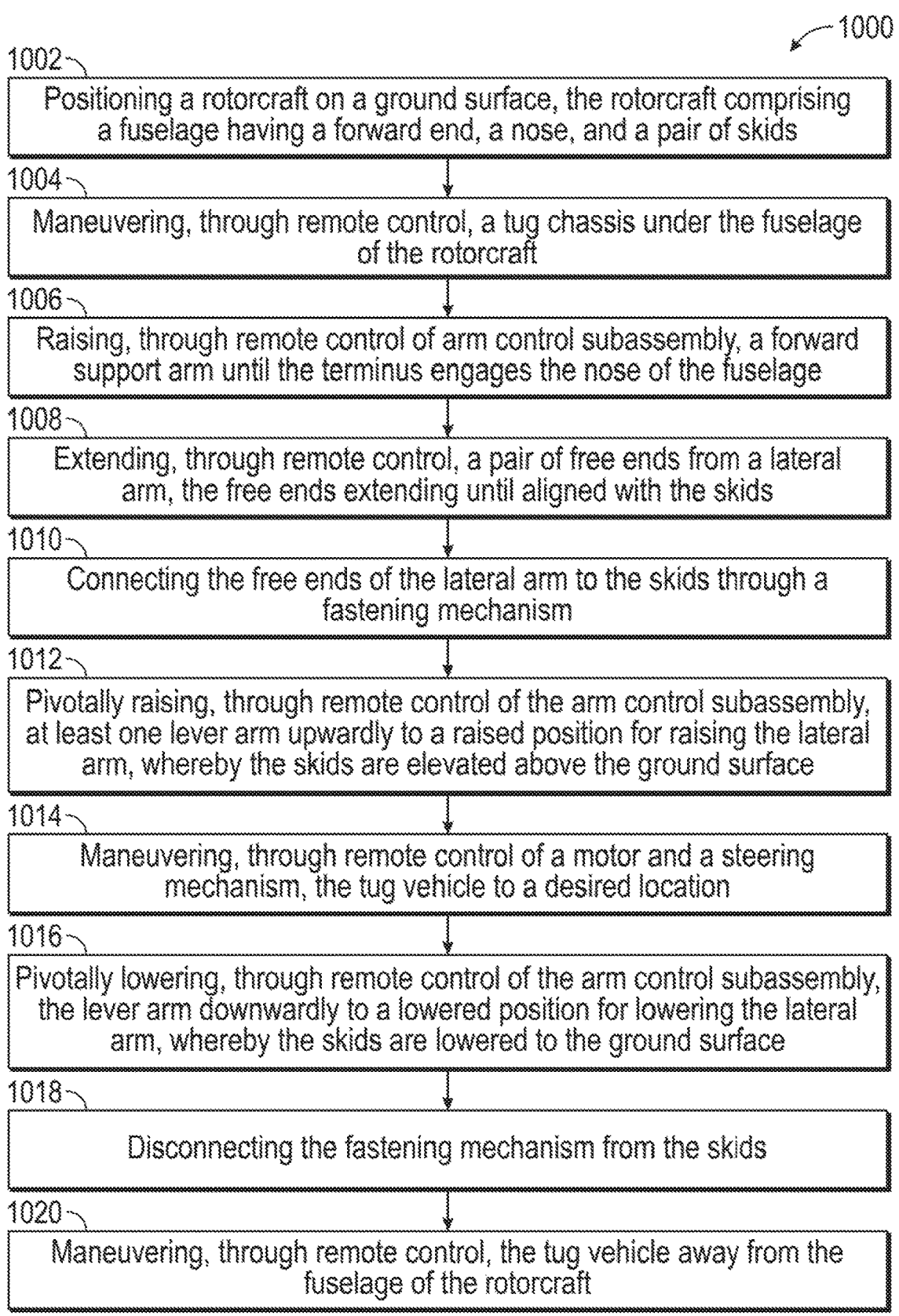
FIG. 10 illustrates a flowchart of an exemplary method for maneuvering a rotorcraft with a wireless remote controlled rotorcraft tug, in accordance with an embodiment of the present invention.

FIG. 10 illustrates a flowchart of an exemplary method 1000 for maneuvering a rotorcraft with a wireless remote controlled rotorcraft tug assembly. The method 1000 may include an initial Step 1002 of positioning a rotorcraft 200 on a ground surface, the rotorcraft 200 comprising a fuselage 202 having a forward end 106a with a nose 204, and an undercarriage 206a-b. Those skilled in the art will recognize that a rotorcraft 200 often requires repositioning for future flights, maintenance, and increasing parking capacity.

The method 1000 may further comprise a Step 1004 of maneuvering, through remote control, a tug vehicle 102 under the fuselage 202 of the rotorcraft 200. A Step 1006 includes raising, through remote control of a control arm subassembly, a forward support arm 108 until the terminus 110 engages the nose 204 of the fuselage 202, the terminus 110 of the forward support arm 108 comprising a support bracket 112. The forward support arm 108 raises and lowers to support the nose 204 of the fuselage 202.

In some embodiments, a Step 1008 comprises extending, manually or through remote control, a pair of free ends 118a-b from a lateral arm 114, the free ends 118a-b extending until aligned with the undercarriage 206a-b. A Step 1010 includes connecting the free ends 118a-b of the lateral arm to the skids 206a-b through a fastening mechanism 120a-b. In some embodiments, a Step 1012 may include pivotally raising, through remote control of the arm control subassembly, at least one lever arm 122a-c upwardly to a raised position for raising the lateral arm 114, whereby the skids 206a-b are elevated above the ground surface. While the rotorcraft 200 is raised in such a manner, the tug vehicle 102 maneuvers the rotorcraft 200 to a desired position.

In some embodiments, a Step 1014 comprises maneuvering, through remote control of a motor and a steering mechanism, the tug vehicle 102 to a desired position. In some embodiments, the tug assembly 100 comprises a motor 136 that advances the tug vehicle 102 by powering at least one drive wheel 132a, 132b mounted on the tug vehicle 102. At least one guide wheel 134a, 134b may also attach to the tug vehicle 102 so the tug vehicle can perform 360° turns and operate with more precise maneuverability.

A Step 1016 includes pivotally lowering, through remote control of the arm control subassembly, the lever arm 122a-c downwardly to a lowered position for lowering the lateral arm 114, whereby the skids 206a-b are lowered to the ground surface. After moving the rotorcraft 200 to a desired position. In the lowered position, the lever arm 122a-c pivots downwardly to lower the lateral arm 114, and thereby return the skids 206a-b to the ground. In some embodiments, a Step 1018 comprises disconnecting the fastening mechanism 120a-b from the undercarriage 206a-b of the rotorcraft 200.

A final Step 1020 includes maneuvering, through remote control, the tug vehicle 102 away from the fuselage 202 of the rotorcraft 200. The radio receiver 138 is operable in the tug vehicle 102 for controlling the motor 136 and the hydraulic or electrical assembly 130 that controls the arms 108, 114, 122a-c. A radio transmitter 140 is operational distally from the tug vehicle 102 to transmit control signals to the radio receiver 138. This allows for remote control of the motor 136, arms 108, 114, 122a-c, hydraulic assembly 128, and electrical assembly 130.

Although the process-flow diagrams show a specific order of executing the process steps, the order of executing the steps may be changed relative to the order shown in certain embodiments. Also, two or more blocks shown in succession may be executed concurrently or with partial concurrence in some embodiments. Certain steps may also be omitted from the process-flow diagrams for the sake of brevity. In some embodiments, some or all the process steps shown in the process-flow diagrams can be combined into a single process.

These and other advantages of the invention will be further understood and appreciated by those skilled in the art by reference to the following written specification, claims and appended drawings.

Because many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. A wireless remote controlled rotorcraft tug assembly, the tug assembly comprising:
   a tug vehicle comprising a frame and an elongated chassis, the frame being defined by a forward end, a rearward end, and sidewalls;
   a fulcrum joined with the frame;
   a forward support arm extending from the forward end of the tug vehicle, the forward support arm being operable to raise to a sloped position, the forward support arm further being operable to lower to a parallel position;
   a lateral arm extending from the sidewalls of the frame, the lateral arm being defined by a middle section and a pair of free ends that slidably extend and retract from the middle section;
   at least one lever arm defined by a fulcrum end and a distal end, the fulcrum end pivotable about the fulcrum, the distal end being joined with the lateral arm,
   whereby the lever arm pivots upwardly to a raised position for raising the lateral arm,
   whereby the lever arm pivots downwardly to a lowered position for lowering the lateral arm;
   an arm control subassembly, the arm control subassembly controlling the arms including the forward support arm, the lateral arm, and the lever arm;
   at least one drive wheel joined to the frame, the drive wheel enabling advancement of the tug vehicle;
   a motor driving the at least one drive wheel;
   a power supply, the power supply powering the motor;
   a steering mechanism operationally attached to the elongated chassis, the steering mechanism guiding the direction of the tug vehicle; and
   at least one guide wheel operatively connected to the steering mechanism, the guide wheel being rotatable up to 360 degrees,
   whereby the tug vehicle is maneuverable in a forward direction, a rearward direction, and a 360 degree radius.

2. The tug assembly of claim 1, wherein the tug vehicle is being defined by a low profile enabling maneuverability beneath a fuselage of a rotorcraft, the fuselage comprising a nose and an undercarriage.

3. The tug assembly of claim 2, wherein the forward support arm terminates at a support bracket, the support bracket aligned with the nose of the fuselage, whereby the forward support arm helps support the rotorcraft.

4. The tug assembly of claim 3, wherein the free ends comprise a fastening mechanism, the fastening mechanism detachably fastening to the undercarriage.

5. The tug assembly of claim 4, wherein the lever arm pivots upwardly to a raised position for raising the lateral arm, whereby skids of the rotorcraft are raised.

6. The tug assembly of claim 5, wherein the lever arm pivots downwardly to a lowered position for lowering the lateral arm, whereby the skids lower.

7. The tug assembly of claim 1, further comprising a radio transmitter being operational to transmit a control signal towards the tug vehicle, the control signal comprising data for controlling the motor, the arm control subassembly, and the steering mechanism.

8. The tug assembly of claim 7, further comprising an antenna joined to the frame, the antenna receiving the control signal.

9. The tug assembly of claim 8, further comprising a radio receiver being operable in the frame, the radio receiver receiving the control signal from the antenna in the form of an electrical signal, whereby the motor, the control assembly, the position of the arms, the steering mechanism, and the direction of the drive wheel are remotely controlled.

10. The tug assembly of claim 1, wherein the tug vehicle has a rectangular shape.

11. The tug assembly of claim 1, wherein the at least one lever arm comprises three hook-shaped lever arms.

12. The tug assembly of claim 4, wherein the fastening mechanism at the free ends of the lateral arm comprises a hook, or a latch, or a carabiner.

13. The tug assembly of claim 1, wherein the at least one guide wheel is disposed at the forward end of the frame.

14. The tug assembly of claim 3, wherein the support bracket comprises a platform and a pair of legs.

15. The tug assembly of claim 2, wherein the rotorcraft is one of the following: a helicopter, a tilt rotorcraft, a quadcopter, a fixed wing aircraft, and a vertical-takeoff and landing vehicle.

16. The tug assembly of claim 1, wherein the arm control subassembly is hydraulically powered.

17. The tug assembly of claim 1, wherein the arm control subassembly is electrically powered.

18. The tug assembly of claim 1, wherein the guide wheel comprises a freely rotating swivel wheel.

19. A wireless remote controlled rotorcraft tug assembly, the tug assembly comprising:
- a tug vehicle comprising a frame and an elongated chassis, the frame being defined by a forward end, a rearward end, and sidewalls, the tug vehicle further being defined by a low profile enabling maneuverability beneath a fuselage of a rotorcraft;
- a fulcrum joined with the frame;
- a forward support arm extending from the forward end of the tug vehicle, the forward support arm being operable to raise to a sloped position, the forward support arm further being operable to lower to a parallel position, the forward support arm terminating at a support bracket configured to align and engage a nose of the fuselage, whereby the forward support arm helps support the rotorcraft;
- a lateral arm extending from the sidewalls of the frame, the lateral arm being defined by a middle section and a pair of free ends that slidably extend and retract from the middle section, the free ends comprising a fastening mechanism, the fastening mechanism detachably fastening to a pair of skids joined to the fuselage;
- three hook-shaped lever arms defined by a fulcrum end and a distal end, the fulcrum end pivotable about the fulcrum, the distal end being joined with the lateral arm,
- whereby the lever arms pivot upwardly to a raised position for raising the lateral arm, thereby lifting the skids,
- whereby the lever arms pivot downwardly to a lowered position for lowering the lateral arm, thereby lowering the skids;
- an arm control subassembly, the arm control subassembly controlling the arms including the forward support arm, the lateral arm, and the lever arms;
- at least one drive wheel joined to the frame, the drive wheel enabling advancement of the tug vehicle;
- a motor driving the at least one drive wheel;
- a differential gear operatively attached to the motor;
- a power supply, the power supply powering the motor;
- a steering mechanism operationally attached to the elongated chassis, the steering mechanism guiding the direction of the tug vehicle;
- at least one guide wheel operatively connected to the steering mechanism, the guide wheel being rotatable up to 360 degrees,
- whereby the tug vehicle is maneuverable in a forward direction, a rearward direction, and a 360 degree radius;
- a radio transmitter being operational to transmit a control signal towards the tug vehicle, the control signal comprising data for controlling the motor, the arm control subassembly, and the steering mechanism;
- an antenna joined to the frame, the antenna receiving the control signal; and
- a radio receiver being operable in the frame, the radio receiver receiving the control signal from the antenna in the form of an electrical signal,
- whereby the motor, the control assembly, the position of the arms, the steering mechanism, and the direction of the drive wheel are remotely controlled.

* * * * *